United States Patent [19]
Takahashi et al.

[11] Patent Number: 5,510,901
[45] Date of Patent: Apr. 23, 1996

[54] SIGNAL RECORDING SYSTEM USING SOUND MEMORY

[75] Inventors: Koji Takahashi; Teruo Hieda; Kenji Kyuma; Yoshihiro Nakatani; Koichiro Suzuki; Takeshi Abe; Yoshifumi Ishikawa, all of Kanagawa, Japan

[73] Assignee: Canon Kabushiki Kaisha, Tokyo, Japan

[21] Appl. No.: 337,317

[22] Filed: Nov. 10, 1994

Related U.S. Application Data

[63] Continuation of Ser. No. 112,049, Aug. 25, 1993, abandoned, which is a continuation of Ser. No. 633,974, Dec. 26, 1990, abandoned.

[30] Foreign Application Priority Data

| Dec. 28, 1989 | [JP] | Japan | 1-344804 |
| Jan. 9, 1990 | [JP] | Japan | 2-002968 |
| Jan. 20, 1990 | [JP] | Japan | 2-011028 |

[51] Int. Cl.⁶ .................................................. H04N 5/76
[52] U.S. Cl. .......................... 358/335; 358/341; 358/343; 360/19.1; 360/33.1; 360/74.1
[58] Field of Search .................................. 358/335, 341, 358/342, 343, 906, 337; 360/19.1, 33.1, 36.1, 36.2, 49, 71, 72.1, 74.1, 74.4; H04N 5/76, 5/78

[56] References Cited

U.S. PATENT DOCUMENTS

| 4,686,587 | 8/1987 | Hipp et al. | 360/72.1 |
| 4,766,505 | 8/1988 | Nakano et al. | 360/19.1 |
| 4,777,537 | 10/1988 | Ueno et al. | 358/341 |
| 4,791,477 | 12/1988 | Blazek et al. | 358/906 |
| 4,849,833 | 7/1989 | Yoshimura et al. | 358/343 |
| 4,931,878 | 6/1990 | Takei et al. | 358/906 |
| 4,961,116 | 10/1990 | Kanamaru et al. | 358/343 |
| 5,012,352 | 4/1991 | Yoshimura et al. | 358/343 |
| 5,050,009 | 9/1991 | Takahashi et al. | 358/341 |
| 5,124,814 | 6/1992 | Takahashi et al. | 358/906 |
| 5,166,804 | 11/1992 | Takahashi | 358/341 |
| 5,204,787 | 4/1993 | Suzuki et al. | 358/337 |

FOREIGN PATENT DOCUMENTS 2223645   4/1990   United Kingdom .

*Primary Examiner*—Tommy P. Chin
*Assistant Examiner*—Khoi Truong
*Attorney, Agent, or Firm*—Robin, Blecker, Daley and Driscoll

[57] ABSTRACT

In a system for reading out an information signal stored in a memory and recording it on a recording medium, renewal of the address of the memory is performed in synchronism with the recording operation, thereby making it possible to record the information signal on the recording medium continuously despite intermittent performance of recording. The address of the memory is returned by a predetermined amount in synchronism with renewal of the address of the memory or the recording operation. Thereby it is also possible to assure good continuity of the recorded information signals. Further, the above-described processing is made easier by making the address of the memory controllable in units of track on the recording medium.

3 Claims, 15 Drawing Sheets

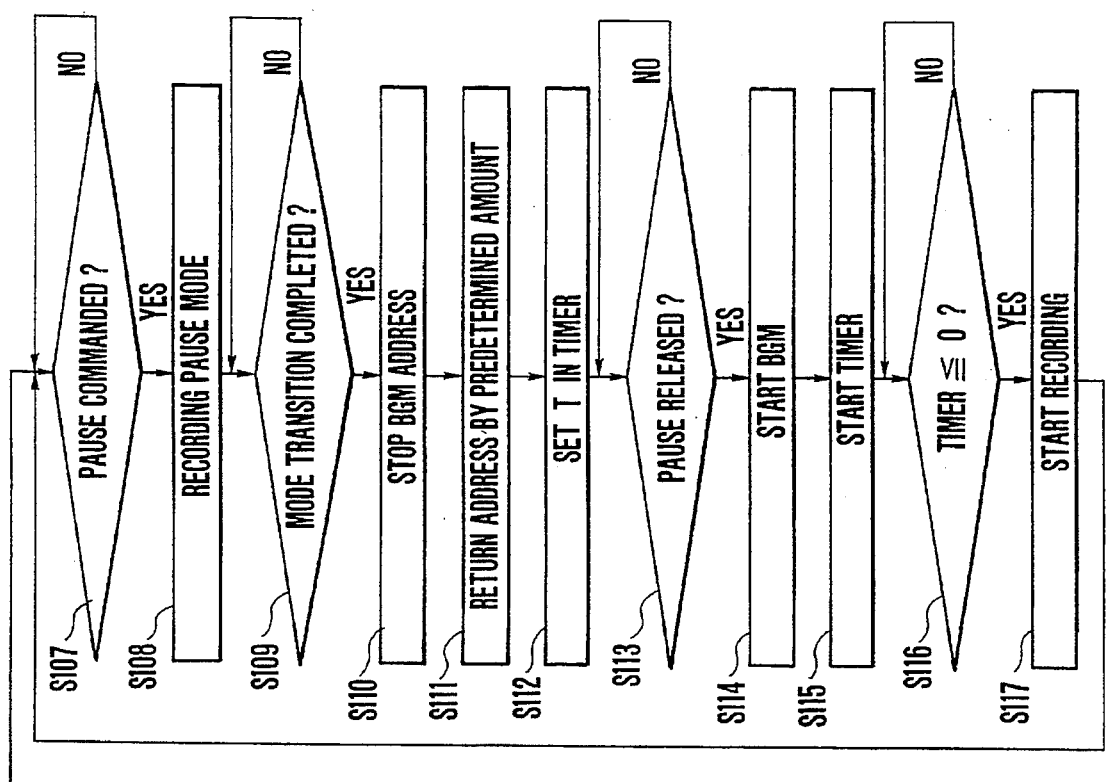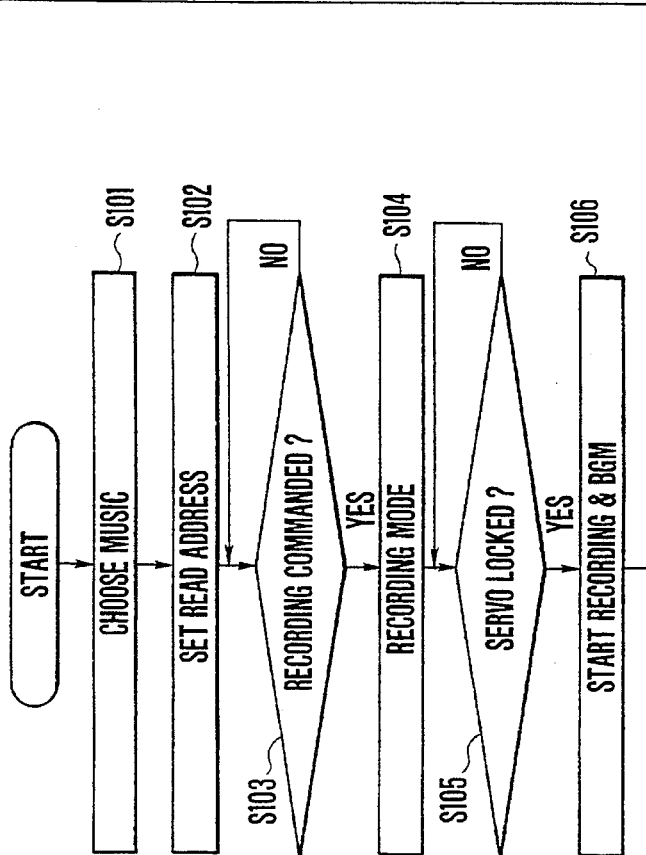
FIG.15

SIGNAL RECORDING SYSTEM USING SOUND MEMORY

This is a continuation application under 37 CFR 1.62 of prior application Ser. No. 08/112,049 filed Aug. 25, 1993, (now abandoned), which is a continuation of Ser. No. 67/633,974, filed Dec. 26, 1990 (now abandoned).

BACKGROUND OF THE INVENTION

1. Field of the Invention

This invention relates to signal recording systems and, more particularly, to a signal recording system using a sound memory.

2. Description of the Related Art

This kind of recording system for video signals has been known in the form of the so-called camera-integrated type video tape recorder (VTR). So, taking an example of this camera-integrated type VTR, the following discussion is conducted.

In the camera-integrated type VTR, another sound such as background music (BGM) can be added to the video image and the sound of a shot scene by the so-called after-recording method as is well known in the art.

Meanwhile, in recent years, performing a recording with video-on-sound (VOS) by utilizing a deep-layer recording method has been proposed.

Since the above-cited after-recording is publicly known, a brief explanation about this VOS will be made below.

The VOS is a technique that while hearing the music previously recorded in a deep layer of the magnetic recording medium as it is being reproduced, one takes pictures in time to this music so that the video signals are recorded in the surface layer of the same medium.

At first, as shown in FIG. 1, an audio signal is previously recorded in a deep layer track a1 of a recording medium a3, while another audio signal of the same content is recorded in the corresponding form in a linear track a2 on the tape-shaped recording medium a3. The photographer will then turn to shooting. At this time, the audio signal recorded in the linear track a2 is reproduced by a fixed head a4, a reproducing circuit a8 and an amplifier a9. By hearing the sound from the output terminal a10, one can identify the content of the audio signal recorded in the deep layer track a1. In time to the sound from the output terminal a10, one then takes pictures by using a camera portion composed of an image sensor a11 and a camera signal processing circuit a12. The video signal from the camera portion is supplied to one of selected recording amplifiers a14 and a15 by a switch a13, and therefrom to a rotary head a6-A or a6-B, by which it is recorded while forming a video track a7 as superimposed on the deep layer track a1.

In such a manner, shooting goes on by hearing the previously recorded BGM or the like. Thus, the recording of pictures in time to the BGM or the like is completed.

However, because the before-described after-recording method is to record a BGM or the like after the shooting has ended, it results that the same tape is subjected to recording twice. Moreover, holding the camera-integrated type VTR aside, one has to synchronously manipulate another apparatus which reproduces the audio signals. Therefore, the shooting operation is very troublesome.

Again, even the above-described VOS method suffers from the same requirement of carrying out recording twice on the same tape. Further, the time space available for taking pictures is limited by the time space of the previously recorded audio signal. This is disadvantageous.

Further, recently, a system provided with a BGM generator has been proposed so that the audio signal produced by the BGM generator is recorded at the same time that video signals are recorded.

FIG. 2 is a diagram exemplifying this kind of system, roughly illustrating the construction of the system as comprising the camera-integrated type VTR and the BGM generator such as a tape player or electronic music box.

In FIG. 2, the camera-integrated type VTR 500 is connected through a terminal 501 to the BGM generator 508. The audio signal from the BGM generator 508 is added to the audio signal from a microphone 502 by an adder 504, and supplied to a recording portion 505. Meanwhile, the video signal from a video camera portion 503 is also supplied to the recording portion 505. So, the recording portion 505 records both the audio signal from the aforesaid adder 504 and the video signal from the aforesaid video camera portion 503 on a common tape according to the known recording format.

Reference numerals 507 and 506 denote respectively an operation portion of the VTR 500 and a system controller for controlling the operation of the recording portion 505 in accordance with the output of the operation portion 507.

With the use of such a system as described above in connection with FIG. 2, when joining one video signal with another, the recording is stopped for a while and started again as is commanded from the operation portion 507. Because the BGM generator 508 operates in no relation with the operation of the VTR 500, it is at the jointed portion of the video signal that the BGM gets too discontinuous. For this reason, when this recorded tape is later subjected to the reproduction, sound skipping occurs even in the BGM at this joined portion, giving a very unpleasant impression to the listeners. In other words, the prior known system is incapable of shooting a plurality of scenes within a common music.

SUMMARY OF THE INVENTION

An object of the invention is to solve the above-described problems.

Another object is to provide a signal recording system which, even in a case where recording of a signal is once stopped and then started again, can record the audio signal without discontinuity.

Under such objects, according to the present invention, in an embodiment thereof, a signal recording system is proposed, comprising first generating means for generating a video signal, second generating means for generating an audio signal including a memory for storing audio information, recording means for recording the video signal from the first generating means and the audio signal from the second generating means on a common recording medium, and synchronizing means for synchronizing recording by the recording means with renewal of an address of the memory for reading out the audio information.

Still another object is to provide a signal recording system for recording signals while forming a great number of tracks, wherein a desired audio signal can be recorded for a desired period of time and this can be carried out easily and accurately.

Under such an object, according to the present invention, in an embodiment thereof, a signal recording system is proposed, comprising information generating means for generating an information signal including a memory, recording means for recording the information signal from the information generating means while forming a multiplicity of parallel tracks on a recording medium, and address control means for controlling the read address of the memory for reading out audio information, the address control means being able to control the read address in correspondence to the tracks.

Other objects than those described above of the invention and its features will become apparent from the following description of embodiments thereof by reference to the drawings.

BRIEF DESCRIPTION OF THE DRAWINGS

FIG. 15 is a flowchart for explaining the operation of the system shown in FIG. 11 and FIG. 12.

DETAILED DESCRIPTION OF THE PREFERRED EMBODIMENTS

The present invention is next described in detail in connection with embodiments thereof.

Figure 3:
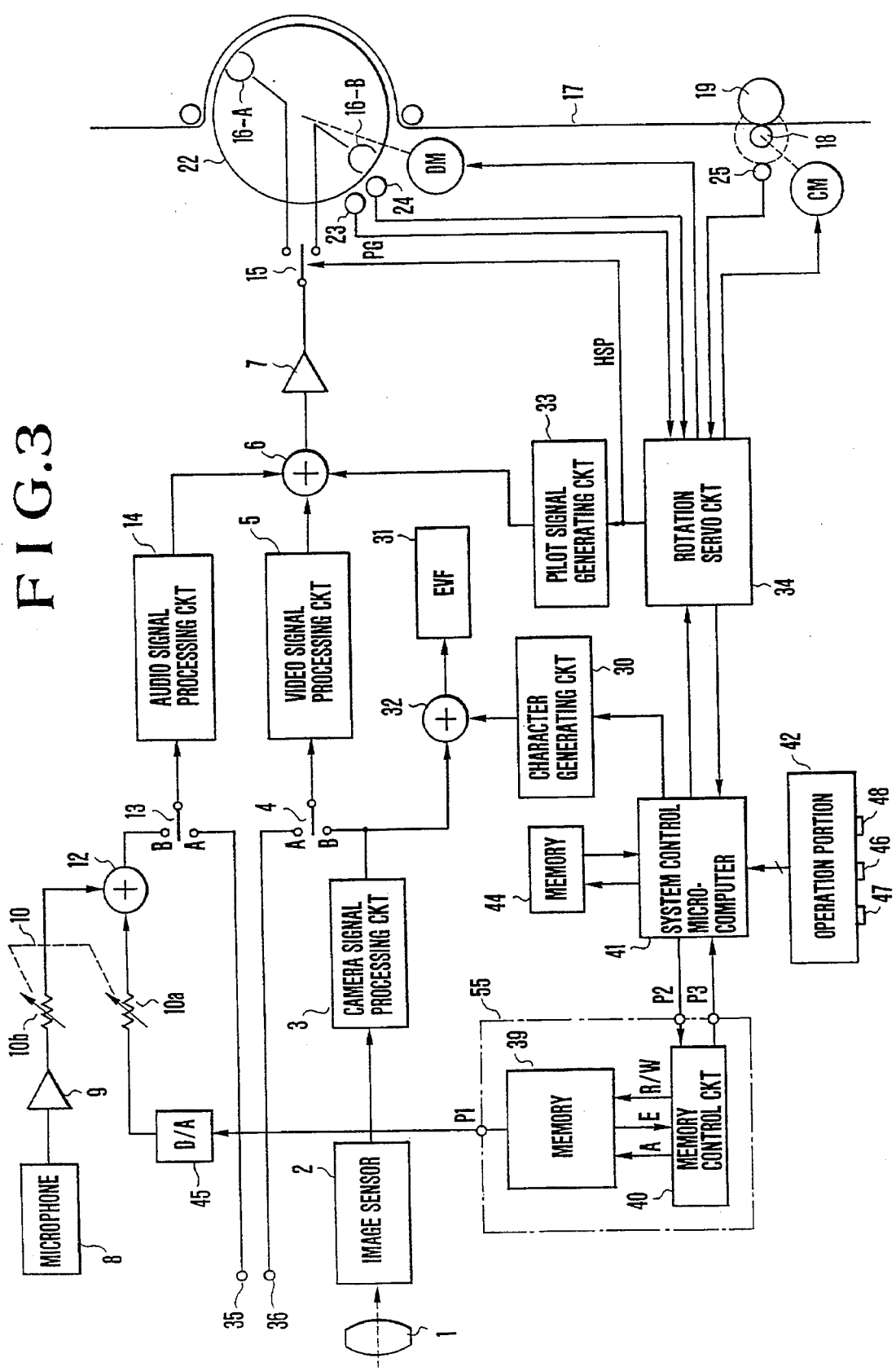
FIG. 3 is a schematic diagram of the construction of the recording system of an embodiment of a camera-integrated type VTR according to the invention.

FIG. 3 shows an embodiment of the invention, where the camera-integrated type VTR comprises a camera portion composed of a picture taking lens 1, an image sensor 2 and a camera signal processing circuit 3, a video signal processing circuit 5 for recording the video signal output from the camera portion, and an audio signal portion having a microphone 8 for collecting sound, a microphone amplifier 9 and an audio signal processing circuit 14. To record the aforesaid audio signal and video signal at once, there is a magnetic recording portion comprising an adder 6, a recording amplifier 7, and a head selection switch 15 cooperating with rotary heads 16-A and 16-B on a drum 22. With the use of this, the video signal and the audio signal are recorded on a tape-shaped recording medium 17.

This VTR further includes the following servo mechanism required to assist in recording. A capstan servo system comprises a capstan 18 pressing the tape 17 on a pinch roller 19, a FG sensor 25 for detecting rotation of the capstan 18 and a rotation servo circuit 34 for controlling the rotational frequency of a capstan motor CM in accordance with the FG signal output from the sensor 25 as the capstan motor CM is driven by the control signal from the servo circuit 34.

A drum servo system for controlling rotation of the rotary drum 22 so that it is synchronized with the vertical synchronizing signal of the video signal, comprises a PG generator 23 for detecting the phase of rotation of the rotary drum 22, a FG generator 24 for detecting the speed of rotation of the drum 22 and the servo circuit 34 for controlling the speed and phase of rotation of the drum 22 in accordance with the output signals of the generators 23 and 24, producing a control signal by which a drum motor DM is driven.

The rotation servo circuit 34 produces a head switching pulse (HSP) having the constant phase relation with the drum PG output from the PG generator 23. Responsive to this HSP, the head selection switch 15 takes alternate positions in periods synchronized with the vertical synchronizing signal of the video signal.

By the arrangement of such a servo mechanism as described above, when in the normal mode of recording the video signal and the audio signal, the relative positions of the heads 16-A and 16-B to the tape 17 are determined.

Next the operation of recording a specified BGM or like sound together with the shot images is described.

The audio signal of the BGM or the like is sampled at a frequency of, for example, 15 KHz to 48 KHz and converted into digital data in a density of quantization of 8 to 16 bits or so, thus being previously written and stored in a digital memory 39. This memory 39 is available in the form of a card-shaped memory unit. So, desired sound information to be used for recording can be chosen when the corresponding card is detachably loaded. In FIG. 3, the card-shaped memory unit is shown as enclosed within a block 55 by dot and dash lines, being made possible to selectively use in the system. For this purpose, the casing of the system is constructed to have a sound input/output port P1 for the memory 39 and interconnection ports P2 and P3 through which a memory control circuit 40 communicates with a system control microcomputer 41.

The audio data read out from the memory 39 is restored to an analog audio signal by a D/A converter 45. This restored analog audio signal is connected to a volume 10a of a sound mixer (balancer) 10. The balancer 10 comprises the volume control 10a for setting a sound volume as obtained from the memory 39, another volume control 10b for setting a sound volume as obtained from the microphone 8, and an adder 12 for mixing the signals from both volume controls. These two volume controls 10a and 10b are connected so as to set the sound volumes complementarily. In more detail, when the volume dial is fully turned to one terminal end, only one of the sounds is output, leaving the other sound not output. At an intermediate position in the range of movement of the dial, both audio signals are output as mixed in the sound volume balance corresponding to that position.

The music such as BGM that is, prior to shooting of pictures, stored in the memory 39 is reproduced from the memory 39 by such a system in such a manner during shooting. The audio signal output from the adder 12 is then processed by the audio signal processing circuit 14. Together with the video signal, it is then recorded on the tape 17.

Incidentally, reference numerals 35 and 36 are external input terminals. One of an external audio signal from the terminal 35 and the audio signal from the aforesaid adder 12 is selected by a changeover switch 13. One of an external video signal from the terminal 36 and the output of the camera signal processing circuit 3 is selected by another changeover switch 4. These changeover switches 4 and 13 are normally set in their B positions. When receiving the external inputs, they are moved to their A positions.

A manner in which the memory 39 is controlled when the camera-integrated type VTR of the present embodiment carries out the joined shooting is described below.

The above-mentioned memory 39 is controlled by the memory control circuit 40 which in turn is controlled by the system control microcomputer 41. The microcomputer 41 is caused to change the control content by the operation portion 42. This operation portion 42 is so constructed as to accept the operations of the following keys. That is, the operation portion 42 includes a memory key 47 for causing music to be stored prior to the camera shooting, a BGM key 46 for setting whether or not to reproduce the sound such as BGM of the memory 39, and a trigger key 48 for starting or stopping a recording operation of the camera-integrated type VTR.

Figure 4:
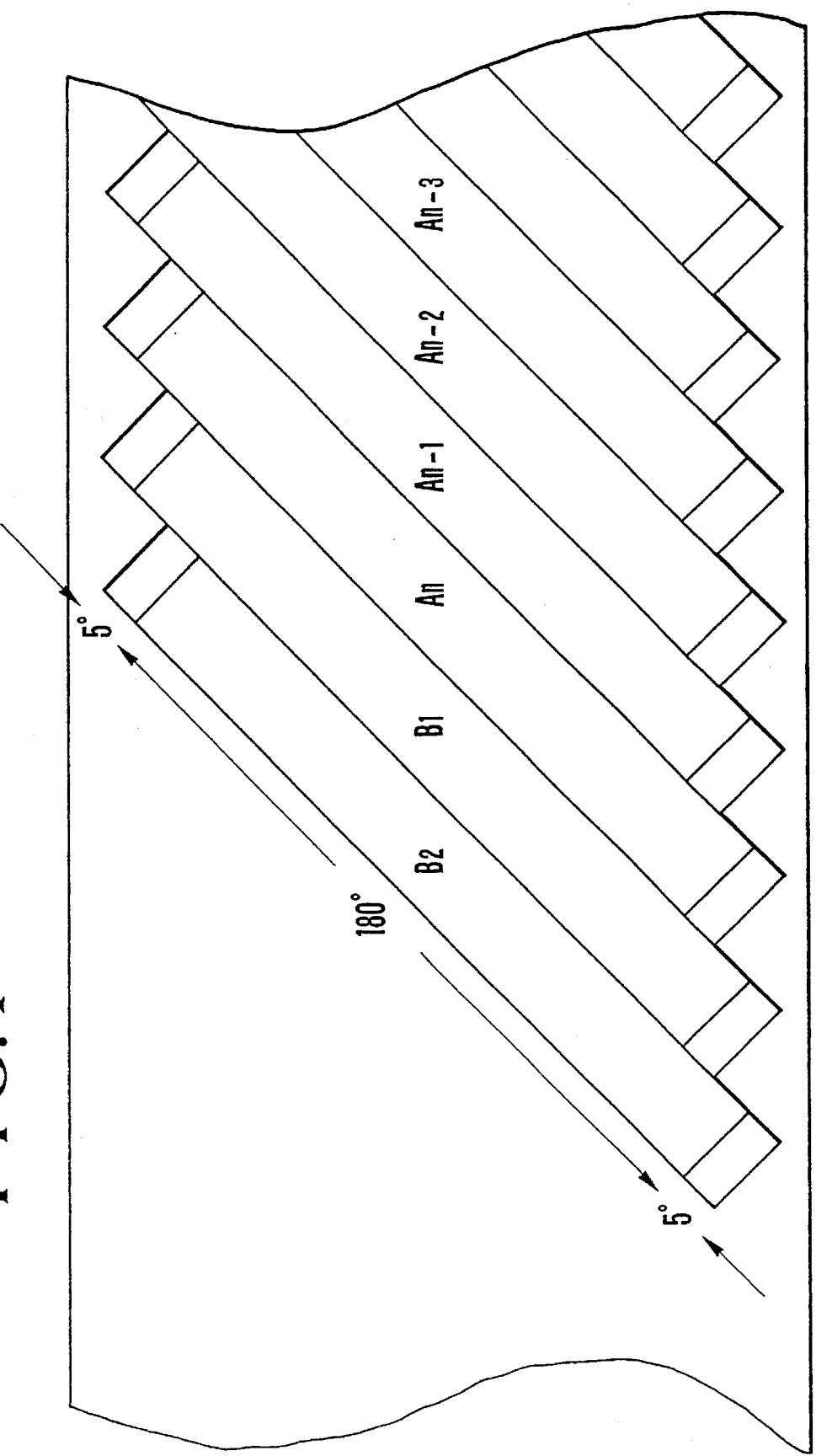
FIG. 4 is a plan view of track patterns formed by the VTR of FIG. 3.

In the joined shooting operation, the microcomputer 41 controls the above-described servo loop so that track patterns are formed on the tape as shown in FIG. 4. When shooting a scene A and another scene B successively in joined relation, the video tracks are formed so that the last track $A_n$ of the scene A and the first track $B_1$ of the scene B lie side by side.

Here, it is desired that though the pictures are discontinuous at the transition of the scene, the BGM or like sound does not break as recording goes from the track $A_n$ to the track $B_1$. To realize the memory control which enables the BGM or like sound to be recorded continuously at such a time of scene transition, the present embodiment makes use of the microcomputer 41 in the VTR.

Figure 5:
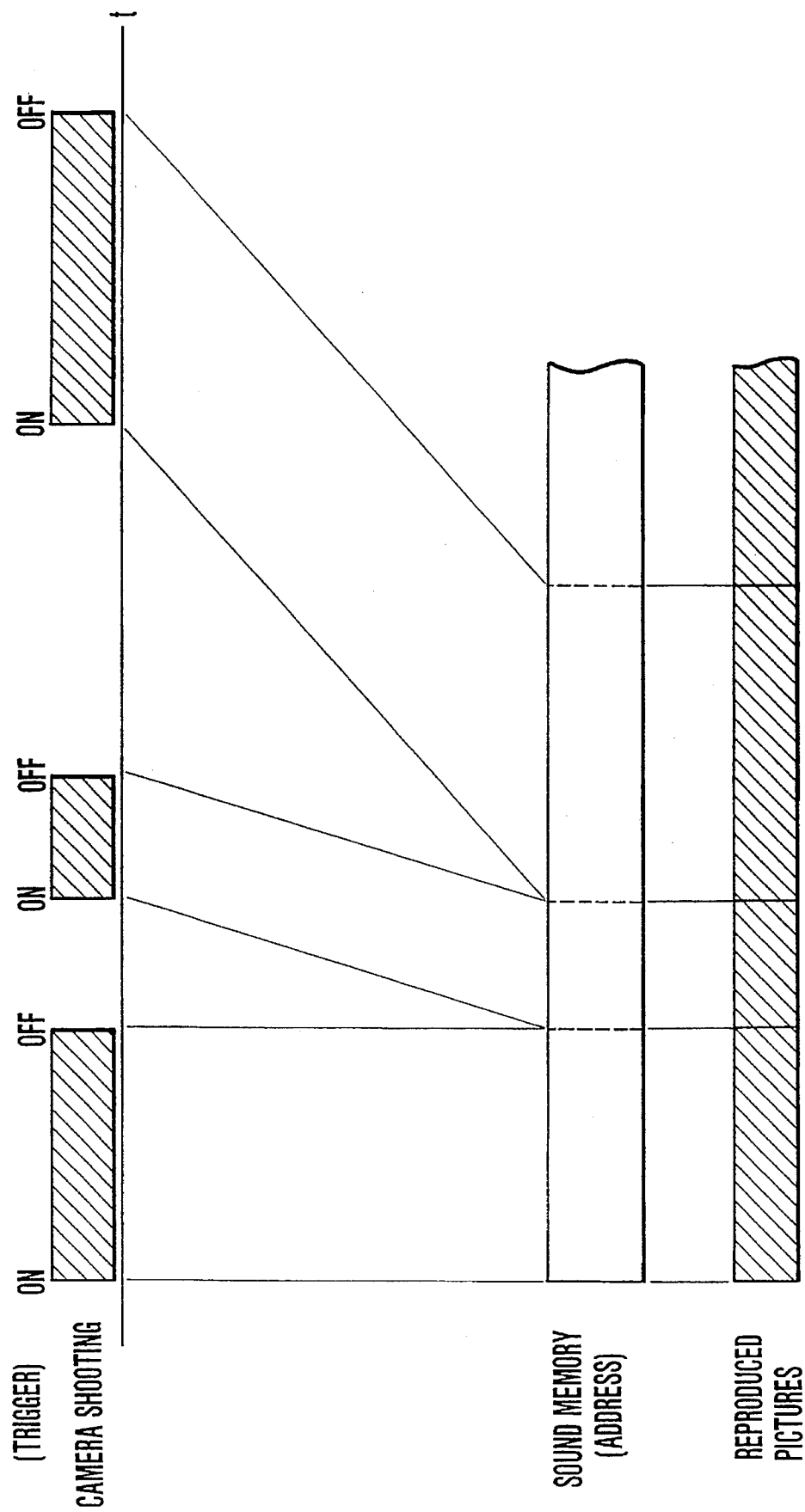
FIG. 5 is a diagram conceptually showing the joined shooting operation of the VTR of FIG. 3.

FIG. 5 graphically shows the idea of the memory control of the present embodiment.

On a top line, there is shown a sequence of the on-off operations of the trigger key 48 as the camera shooting is recycled. The hatching portions indicate the recording periods with the abscissa representing time.

In correspondence with this, the memory control circuit 40 operates so that only when the trigger key 48 is in an on state, the audio data is read out from the sound memory 39. This manner is shown on a middle line with the addresses of the memory 39 taken in the abscissa.

A bottom line for the reproduction mode represents a sequence of the reproduced scenes in correspondence with the music from the memory 39 with the abscissa representing time.

Figure 6:
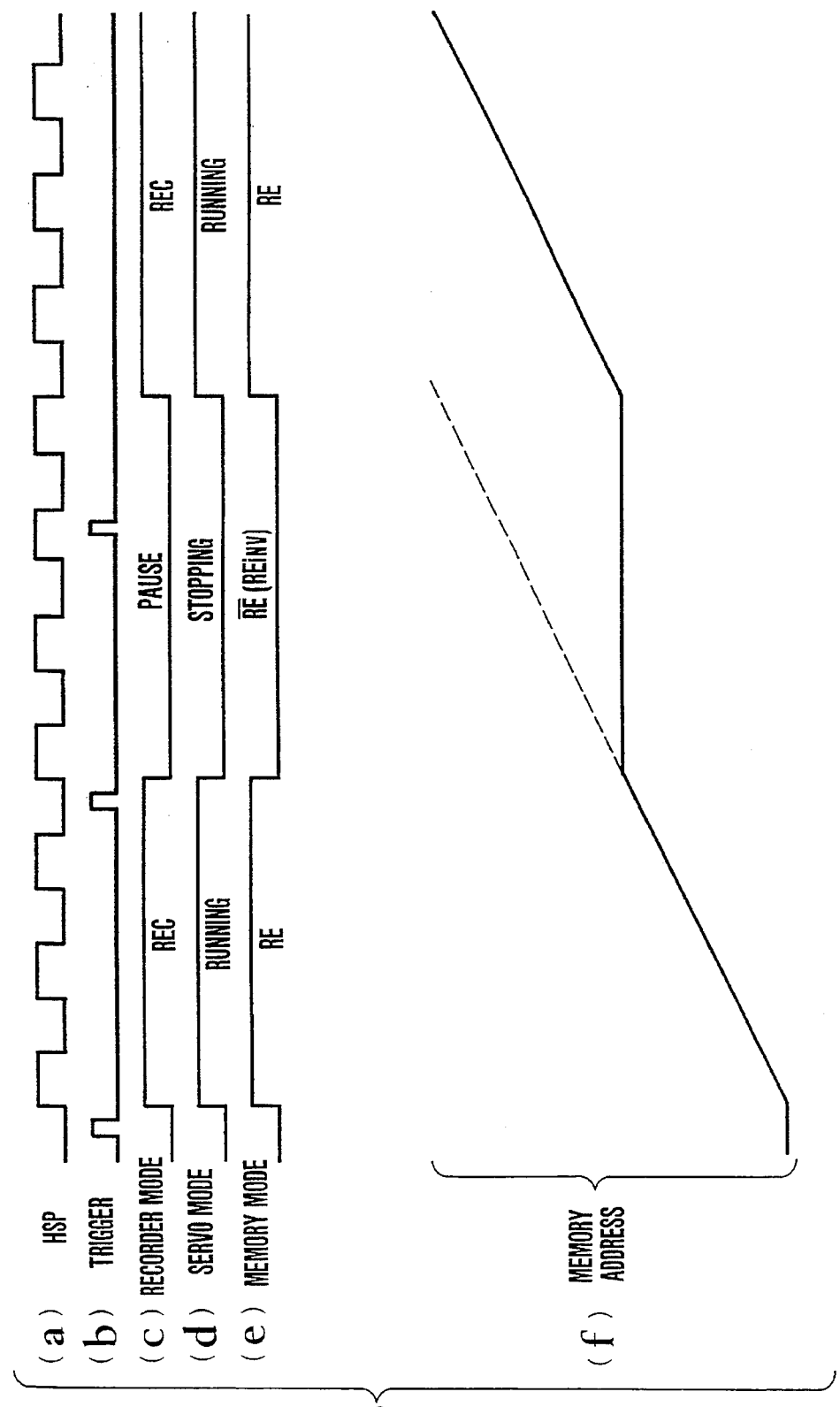
FIG. 6 is a chart illustrating the detailed timing concerned with the addresses of the memory in the VTR of FIG. 3.

Further, the timing in which the address of the memory 39 advances is shown in detail in FIG. 6.

In FIG. 6, on a line (a), the HSP (Head Switching Pulse) inverts in each one unit time of track formation (one field period). In FIG. 6, (b) is an instruction pulse from the trigger key 48; (c) is a recorder mode control signal which alternates REC (recording) and PAUSE (waiting for recording), each time the trigger pulse (b) is received, in synchronism with the inversion of the HSP; (d) is a servo mode control signal which alternates running (RUN) and stopping (STOP) of the tape in correspondence with the recorder mode control signal (c); and (e) is a memory mode control signal supplied from the memory control circuit 40 to the memory 39. In correspondence with the servo mode control signal (d), the signal (e) selectively sets an RE (Read Enable) mode in which the audio signal is read out only when the tracks are formed and the inverted or an $RE_{inv}$ (read disable) mode. In FIG. 6, (f) is an address control signal for the sound memory 39 supplied from the memory control circuit 40 to the memory 39. The prolongation of the first inclined address line fragment is conceptually shown, similar to FIG. 5, by a dashed line with which the second one will be brought into coincidence when in the reproduction mode, as the time is contracted by an equal space to that for which the tape is stopped when in the recording mode.

As is apparent from FIG. 6, only when the tape is running as the video signal from the camera portion is recorded thereon, the memory 39 operates in the RE mode where the memory address is counted up, thereby making it possible to perform the recording without making the sound such as BGM discontinuous when the joined shooting is carried out.

Next, the operation of the microcomputer 41 at the time of the joined shooting is described by reference to the flowchart of FIG. 7.

Figure 7:
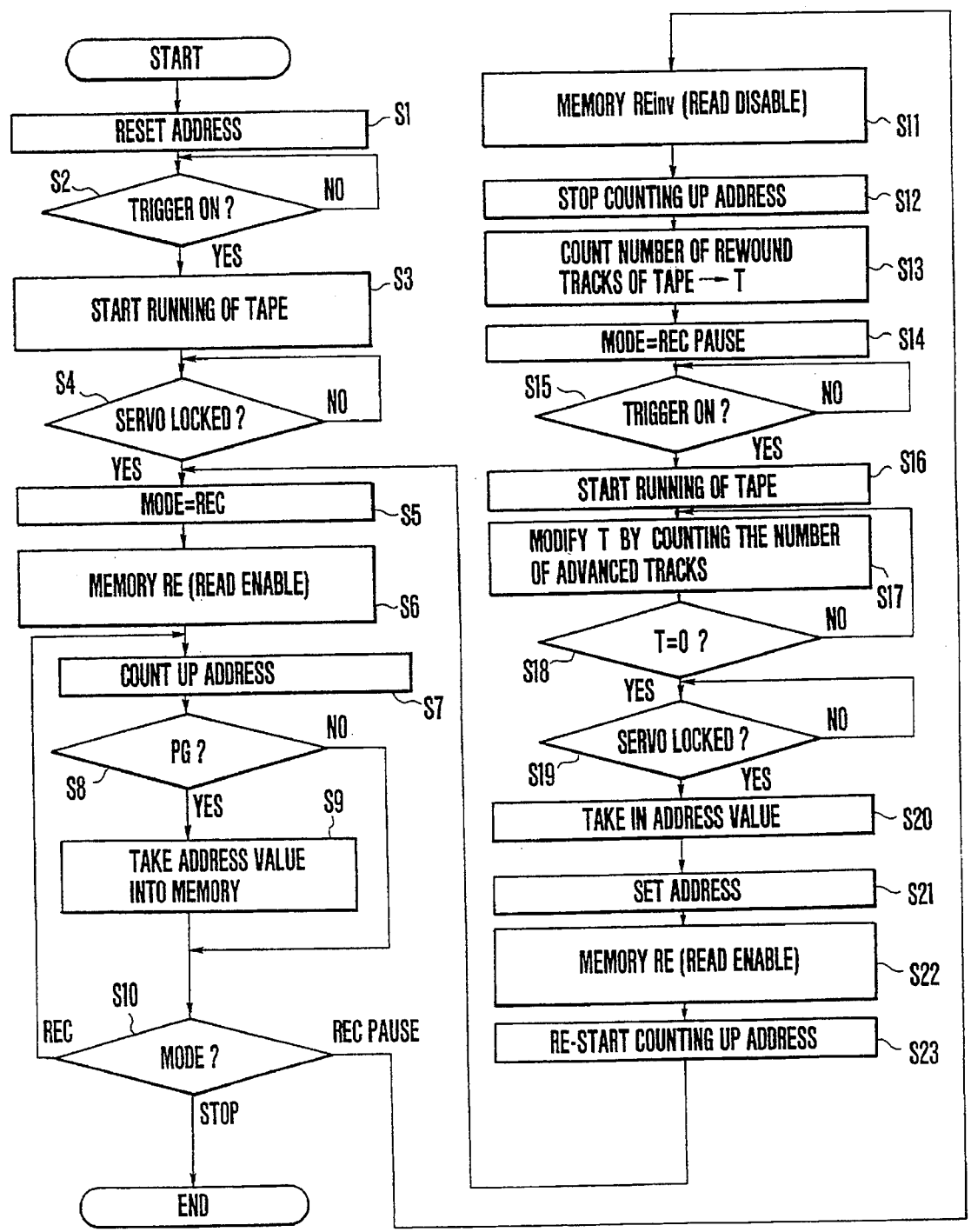
FIG. 7 is a flowchart for explaining the operation of the VTR of FIG. 3.

An electric power source key (not shown) is pushed down to render the microcomputer 41 operative according to the flowchart of FIG. 7. At first, it gives an instruction to the memory control circuit 40 so that the address of the memory 39 is reset (step S1). After this, when the trigger key 48 is pushed down (step S2), another instruction for starting running of the tape is given to the servo circuit 34 (step S3). After the tape has started to run, when the speed of the tape is locked to a predetermined value as detected by the servo circuit 34 (step S4), the VTR is switched to the recording mode (step S5) and the data in the memory 39 is enabled to be read out (step S6). It is to be noted that the flowchart is made on the assumption that the BGM key 46 is in an on state, that is, the VTR is set in the mode in which the data is read out from the memory 39.

In this state, as has been described before, the audio signal from the audio signal processing circuit 14, the video signal from the video signal processing circuit 5, and, further, pilot signals for tracking control from a pilot signal generating circuit 33 are added by the adder 6 and recorded on the tape 17. The pilot signal generating circuit 33 produces four pilot signals of different kinds rotationally in sequence by every one field according to, for example, the HSP. Again, in this state, the microcomputer 41 supplies information representing that recording of the sound from the memory 39 is in progress to a character generating circuit 30. The circuit 30 converts this information into a video signal corresponding to the visually recognizable characters, which is then supplied to the adder 32. By this, when the sound from the memory 39 is being recorded, the aforesaid characters are presented on an electronic viewfinder (EVF) 31 together with the picture being shot.

In this recording state, a counter in the memory control circuit 40 counts up the address (step S7). Also, each time the edge of the PG is inputted (step S8), the address data which is currently counted is written in the memory 44 (step S9).

When a stop key (not shown) is pushed down at a time during the recording operation in a step S10, the VTR comes into the stop mode and the processing is completed. Then, when the trigger key 48 is pushed down again, the VTR comes into a recording pause mode, where the memory 39 is prohibited from being read (step S11) and, at the same time, the address counter is stopped from further counting (step S12), thus stopping reading of the sound information from the memory 39.

Then, the servo circuit 34 is commanded to rewind the tape 17 by a predetermined amount. This rewound amount of the tape is memorized in the form of the track number T (step S13). Here, the VTR is put in the recording pause mode (step S14) and waits for the next actuation of the trigger key 48.

When the trigger key 48 is pushed down, the VTR comes first into the reproduction mode, where the servo circuit 34 is controlled so that the tape starts to run again (step S16). As the tape is running, counting down from the aforesaid track number T by the number of advanced tracks goes on to modify the number of rewound tracks T at the present time. Then, when T=0 results (step S18), completion of servo locking is confirmed (step S19). The address data stored in the memory 44 is then taken in (step S20). This data is then set in the address counter in the memory control circuit 40 (step S21). Then, the memory 39 is switched to the reading mode again (step S22) and, at the same time, the address counter starts again counting (step S23). Therefore, reading of the sound from the memory 39 is started again. At the same time as this re-start, a return to the step S5 occurs and the VTR is switched to the recording mode again.

If such a procedure as has been described above repeats itself until all the cycles of joined shooting operations amount to a equal or longer total recording time to or than the time of the music stored in the memory, a piece of music can be recorded without discontinuity in added relation to a series of images shot by the joined shooting operation.

It will be appreciated even from the foregoing description of the embodiment that according to such a video signal recording system as has been described above, even when recording video signals, the certain music formed in separation can be recorded with ease and, moreover, it has been made possible to record the audio signals continuously at the discontinued portions of the video signals.

Figure 8:
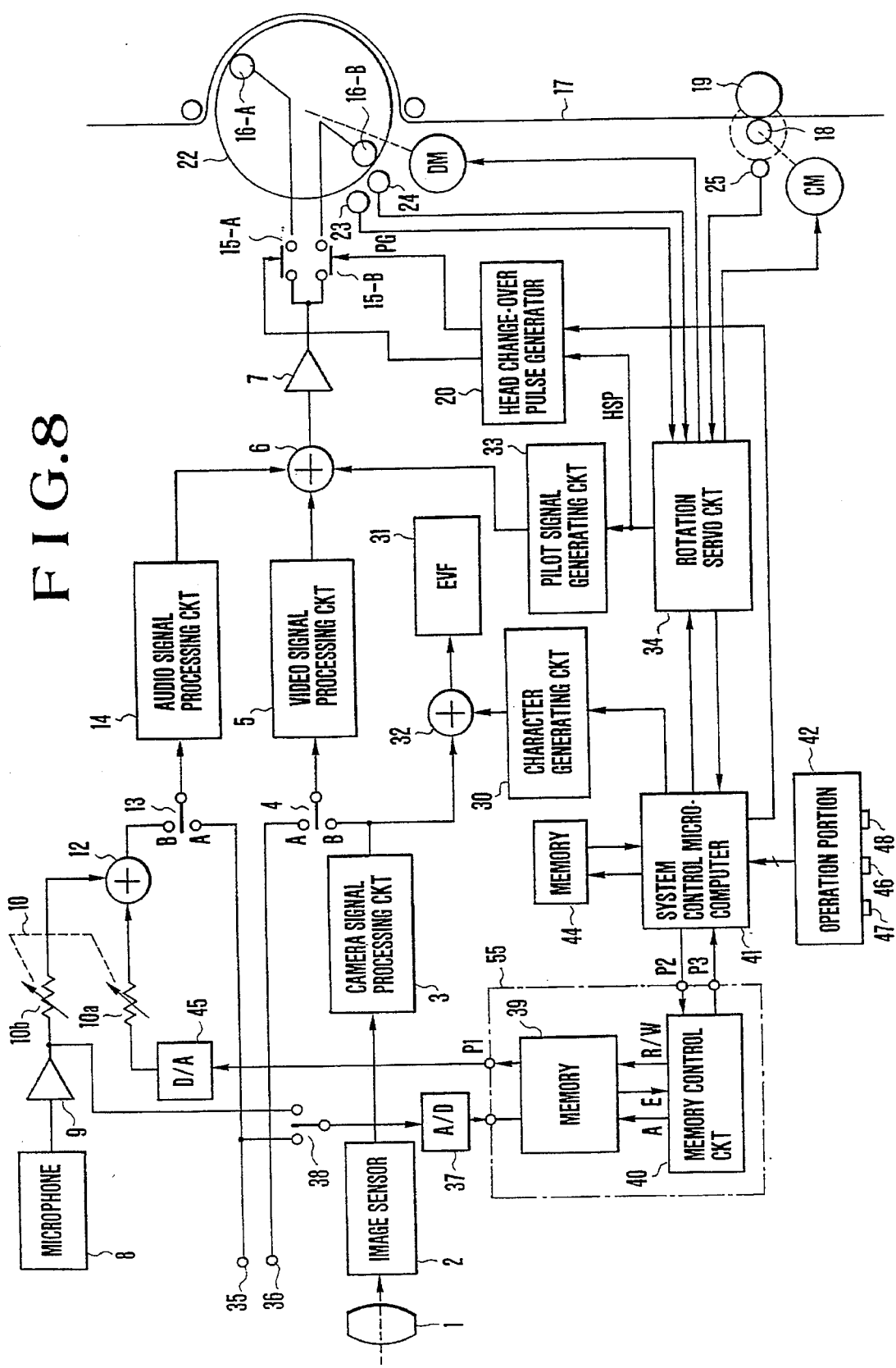
FIG. 8 is a schematic diagram of the construction of the recording system of another embodiment of the camera-integrated type VTR according to the invention.

Next, another embodiment which has improved the foregoing embodiment is described. FIG. 8 shows a camera-integrated type VTR employing another form of the invention, where the like parts with those of the example of FIG. 3 are denoted by the same reference numerals. Different points from the example of FIG. 3 only are described below.

In the VTR of the present embodiment, the HSP from the rotation servo circuit 34 is supplied to a head changeover pulse generator 20. By the output pulse of this generator 20, head changeover switches 15-A and 15-B are controlled. These switches 15-A and 15-B are opened and closed in such a way that the heads 16-A and 16-B record the signals in alternately overlapped relation with each other. The opening and closing operation of the switch 15-A or 15-B is recycled, of course, in every two vertical synchronizing periods.

Another feature which is characteristic of the present embodiment is that the memory control circuit 40 performs address determination and changeover between the write and read modes of the memory 39 in units of one track as will be described later.

Therefore, in the camera-integrated type VTR of the present embodiment, the signal recorded or to be recorded in a 180° portion of the preceding or following track overlaps with that being recorded in a 5° portion of either terminal end of each track.

Still another feature is that the memory mode control signal (e) shown in FIG. 6 recycles changing over between the RE mode and REinv mode by every one track unit, and the address signal (f) has its upper bits corresponding to each track, and its lower bits reset in each inversion timing of the HSP.

Figure 9:
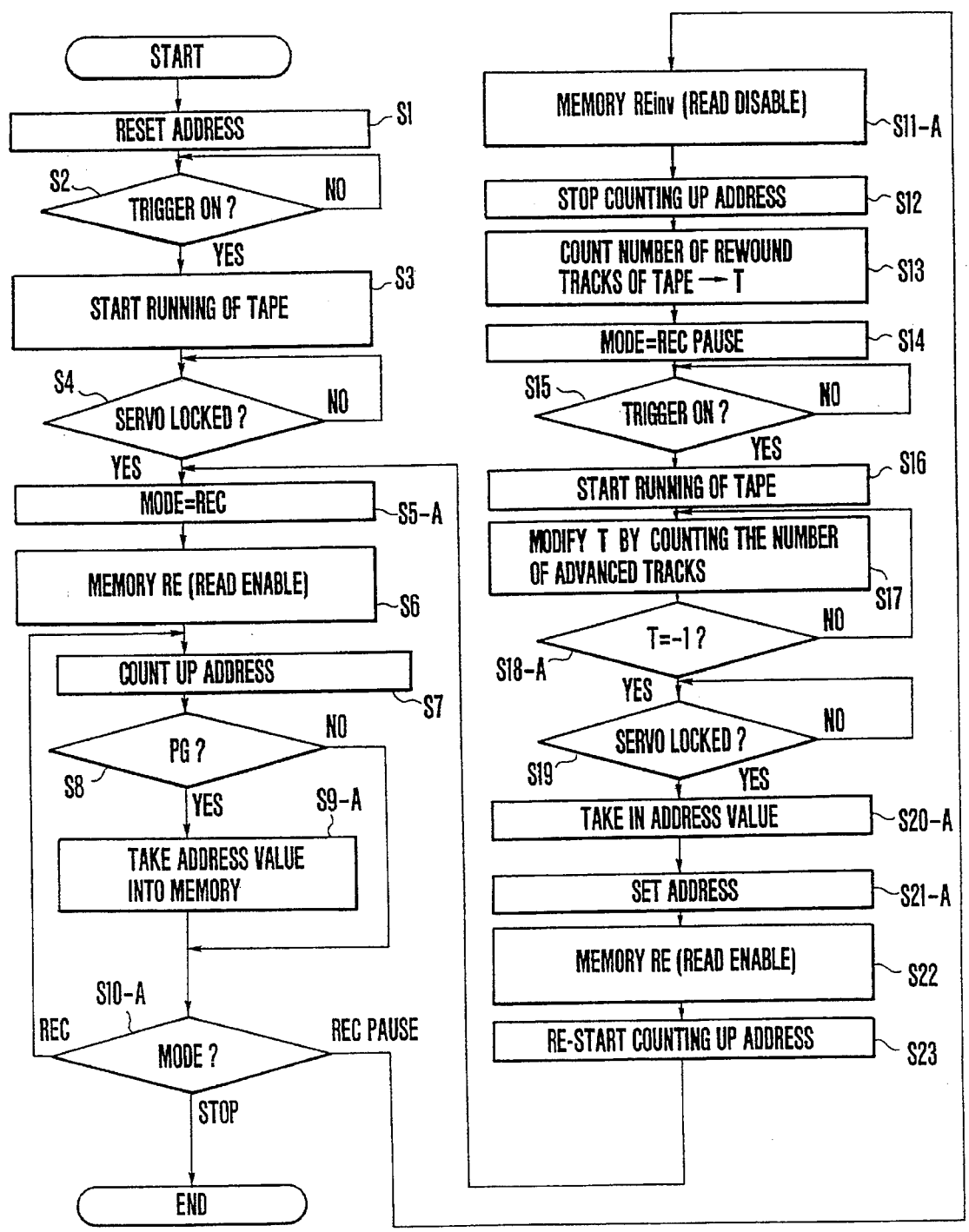
FIG. 9 is a flowchart for explaining the operation of the VTR of FIG. 8.
Figure 10:
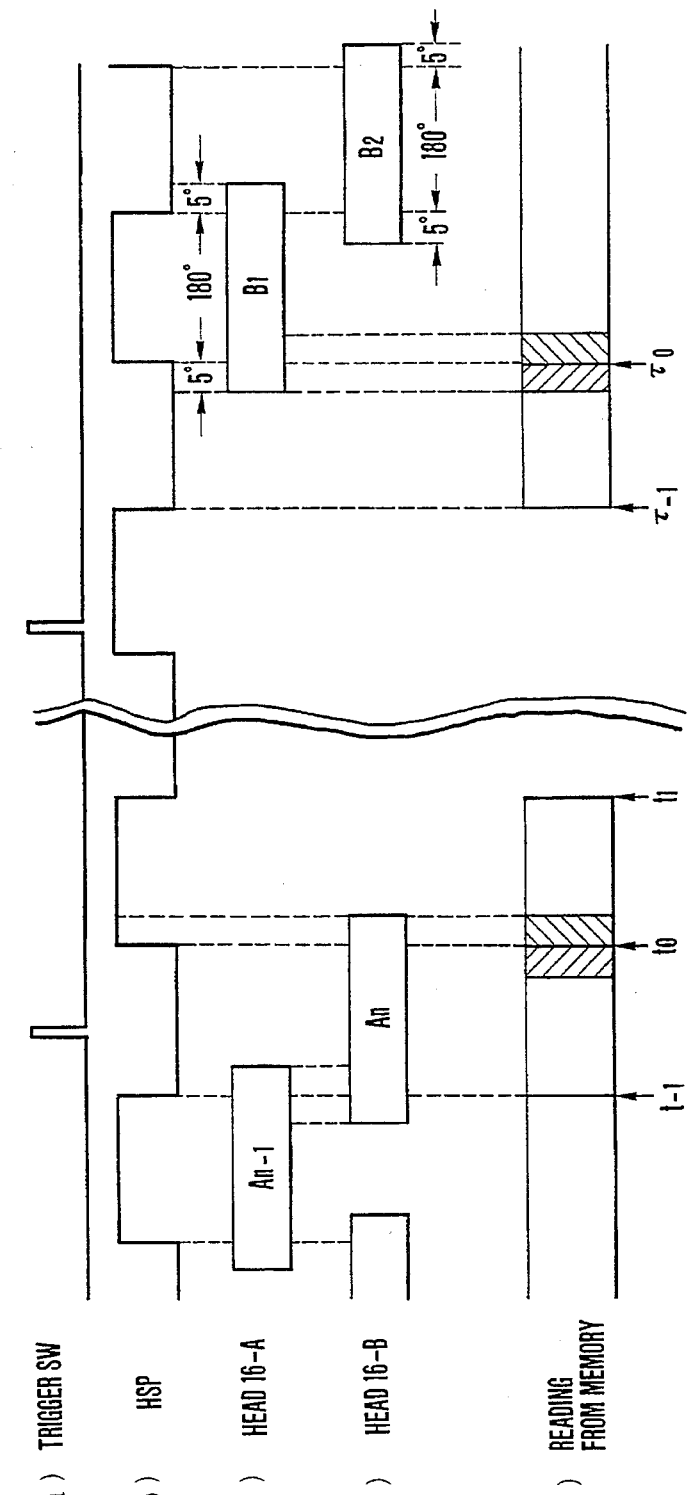
FIG. 10 is a timing chart for explaining the joined shooting operation of the VTR of FIG. 8.

The operation of the microcomputer 41 in the joined shooting mode of the present embodiment is described by reference to the flowchart of FIG. 9 and the timing chart of FIG. 10. Incidentally, the steps of the flowchart of FIG. 9 which are different from the flowchart of FIG. 7 are indicated by a suffix A, and the others are similar to those of the flowchart of FIG. 7.

In the present embodiment, the memory 44 is so arranged as to store only the upper bits of the address data. Therefore, the upper bits of the address data which are currently counted are written in the memory 44 in a step S9-A. The written upper bits in the memory 44 are of the address data occurring at a point of time t-1 in FIG. 10.

When the stop key (not shown) or the like is pushed down at a time during recording in a step S10-A, the VTR is switched to the stop mode and the processing is completed.

Meanwhile, when pushing down again the trigger key 48, in timing with the next rising edge of the HSP (at a time $t_0$ in FIG. 10), recording of the second field of video signal in an even-numbered track is completed. In effect, however, the switch 15-B is turned off in such timing that it is delayed by a period for which the rotary head rotates 5° from the time $t_0$. In FIG. 10, (c) and (d) each show the timing of supply of recording signals to the head 16-A or 16-B respectively. Therefore, it is to be understood that the arrangement is made such that the termination of duration of recording onto the tape 17 is deferred pending the completion of full formation of this even-numbered track An.

Here, since the memory 39 has its mode controlled in units of one track, reading of the memory 39 is stopped in timing with the falling edge of the next HSP (at $T_1$ in FIG. 10) (step S11-A) and counting of the address counter, too, is stopped (step S12), so that reading of the audio information from the memory 39 is stopped.

Then, the servo circuit 34 causes the tape 17 to be rewound by a predetermined amount. The rewound amount is memorized with the aforesaid $t_O$ taken as 0 timing, and the track number as T (step S13). Here, the VTR is switched to the mode of stopping recording for a while (step S14), and waits for the trigger key 48 to be pushed down again (step S15).

When the trigger key 48 is pushed down, the VTR operates first in the reproduction mode and the servo circuit 34 is controlled so that the tape starts running again (step S16). As the tape is running, the aforesaid track number T is then counted down by the number of advanced tracks, so that the number of rewound tracks T is modified to a current value. When T=−1 results (step S18-A), and completion of servo locking is confirmed (step S19), the upper bits of the address data stored in the memory 44 are taken in (step S20-A), and this data is transferred to and set in the address counter in the memory control circuit 40 (step S21-A). So, from the timing at T=−1 (indicated by τ−1 in FIG. 10), reading of the memory 39 is started (step S22). The read address to be used at this time is defined by using the upper bits of the address data obtained in timing with the t-1 stored in the memory 44, while resetting the lower bits. At the start of reading the memory 39, counting of the address counter is started again (step S23). In such a manner, reading of the memory 39 is started again.

After this, the switch 15-A is turned on earlier than the rising timing $\tau_0$ of the next HSP by a period for which the rotary head rotates 5°, and recording of the signal by the head 16-A is started. Thus, the VTR is switched to the recording mode again (step S5-A). The signal is recorded in the track $B_1$ of FIG. 4 beginning from the overlap portion. Hence, the same audio signal which corresponds to the hatched portion of FIG. 10 is double recorded in both track $A_n$ and track $B_1$.

By such a procedure as has been described above, the audio signal stored in the memory can be recorded as a continued audio signal even in the joined portions of the video signals, and is recorded in overlapped relation between the adjacent two of the tracks. Also, since, at this time, the read address for the memory 39 is controlled always in units of track, the determination of the address can be controlled very easily.

According to the above-described system of the embodiment, even when recording video signals, the certain music formed in separation can be recorded easily and its continuity is not lost. Also, reading from its memory can be controlled in a very simple way.

Figure 1:
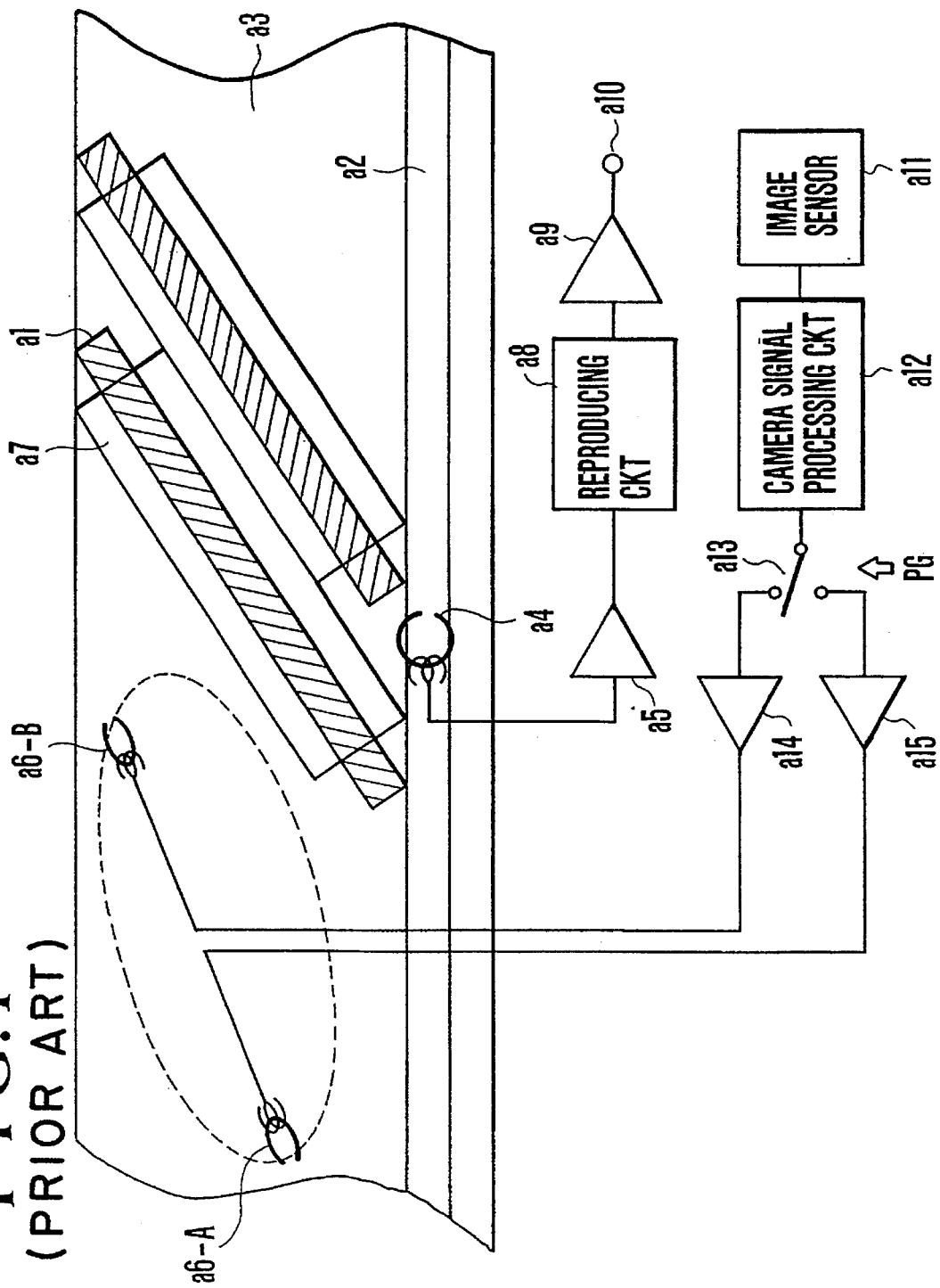
FIG. 1 is a diagram illustrating an example of a system for additionally recording audio signals.
Figure 2:
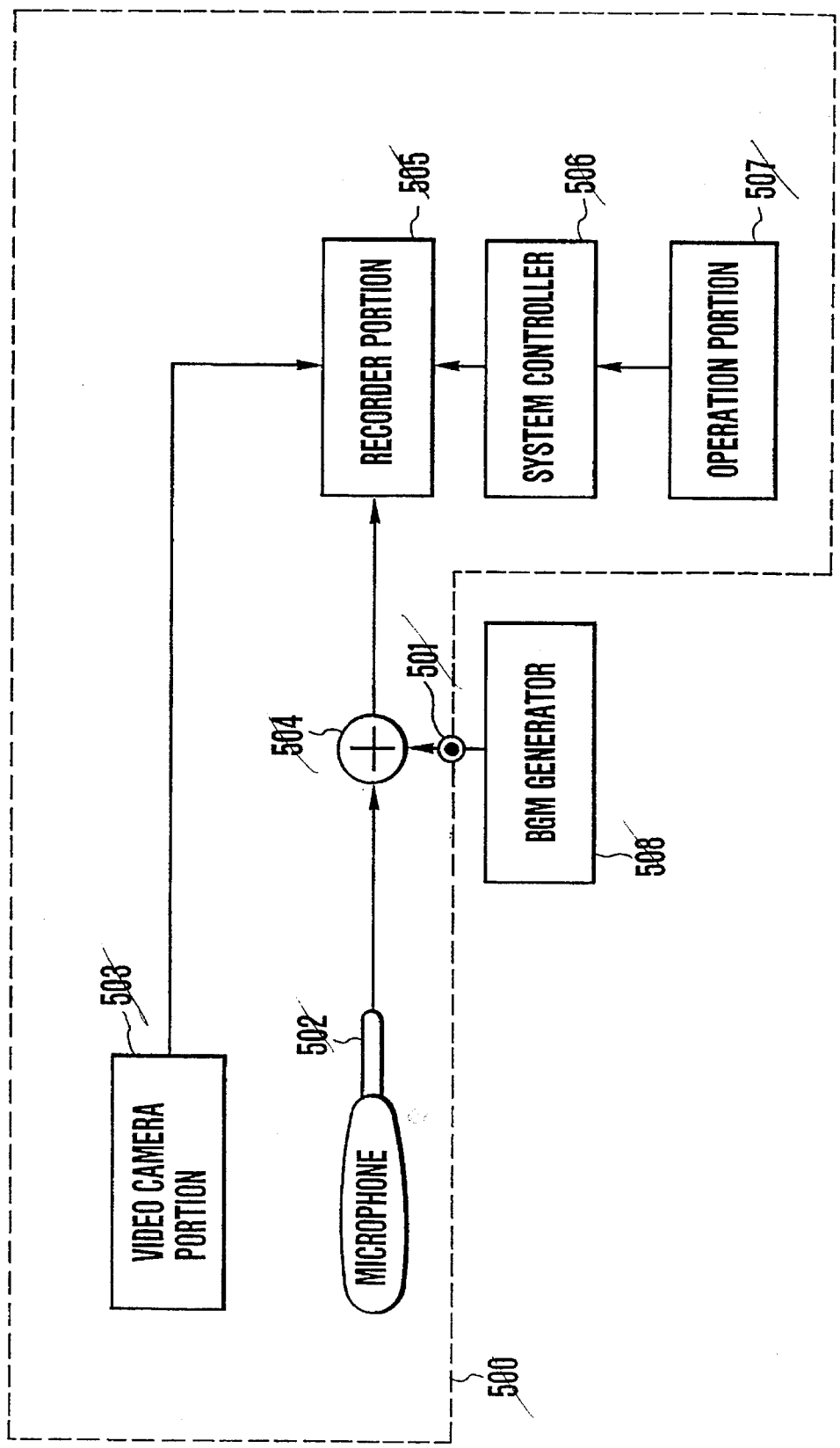
FIG. 2 is a diagram illustrating an example of a system for additionally recording audio signals by using a BGM generator.

Next, another embodiment employing a BGM generator such as that shown in FIG. 2 is described.

Figure 11:
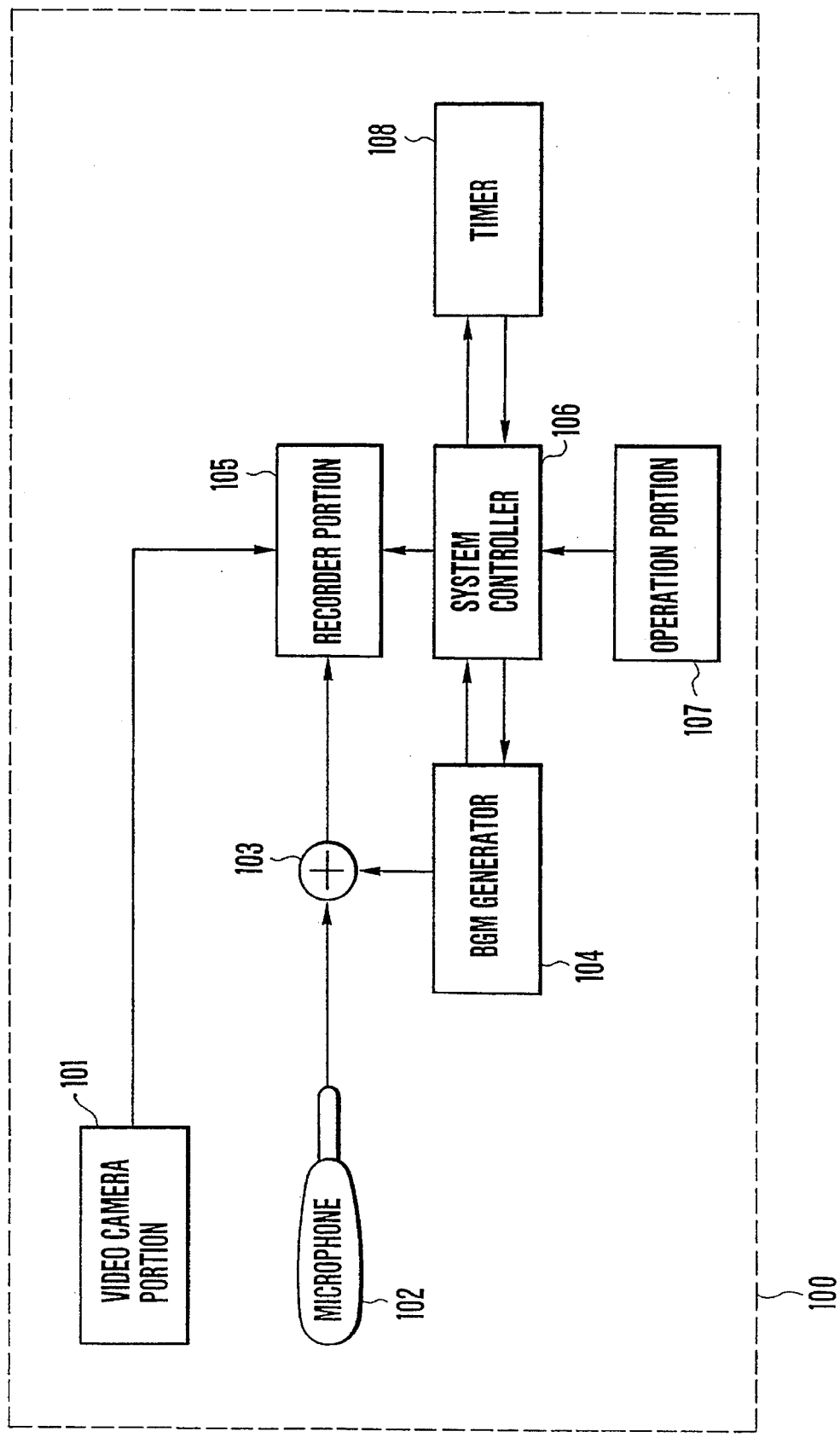
FIG. 11 is a schematic diagram of the construction of the entirety of still another embodiment of the camera-integrated type VTR according to the invention.

FIG. 11 is a diagram schematically showing the construction of the entirety of yet another embodiment of the system according to the invention. In the figure, reference numeral 100 denotes a camera-integrated type VTR. To the VTR 100, a BGM generator 104 is detachably mounted. With the use of this arrangement, similarly to the system of FIG. 2, the video signal from the camera portion 101 and the audio signals from the microphone 102 and the BGM generator 104 are recorded on the tape in the known way.

A system controller 106 controls the recording portion 105 according to the instruction from the operation portion 107. For example, pause of recording, re-starting of recording, etc., are carried out as instructed by the operation portion 107.

In the present embodiment, as will be described in detail later, when recording by using the BGM generator 104 is stopped, the read address in the internal memory is returned back by a predetermined time space. On receipt of a command of re-starting recording, reading begins from this returned address. This time space is controlled by using a timer 108 arranged so that data are sent and received between the timer 108 and the system controller 106.

Figure 12:
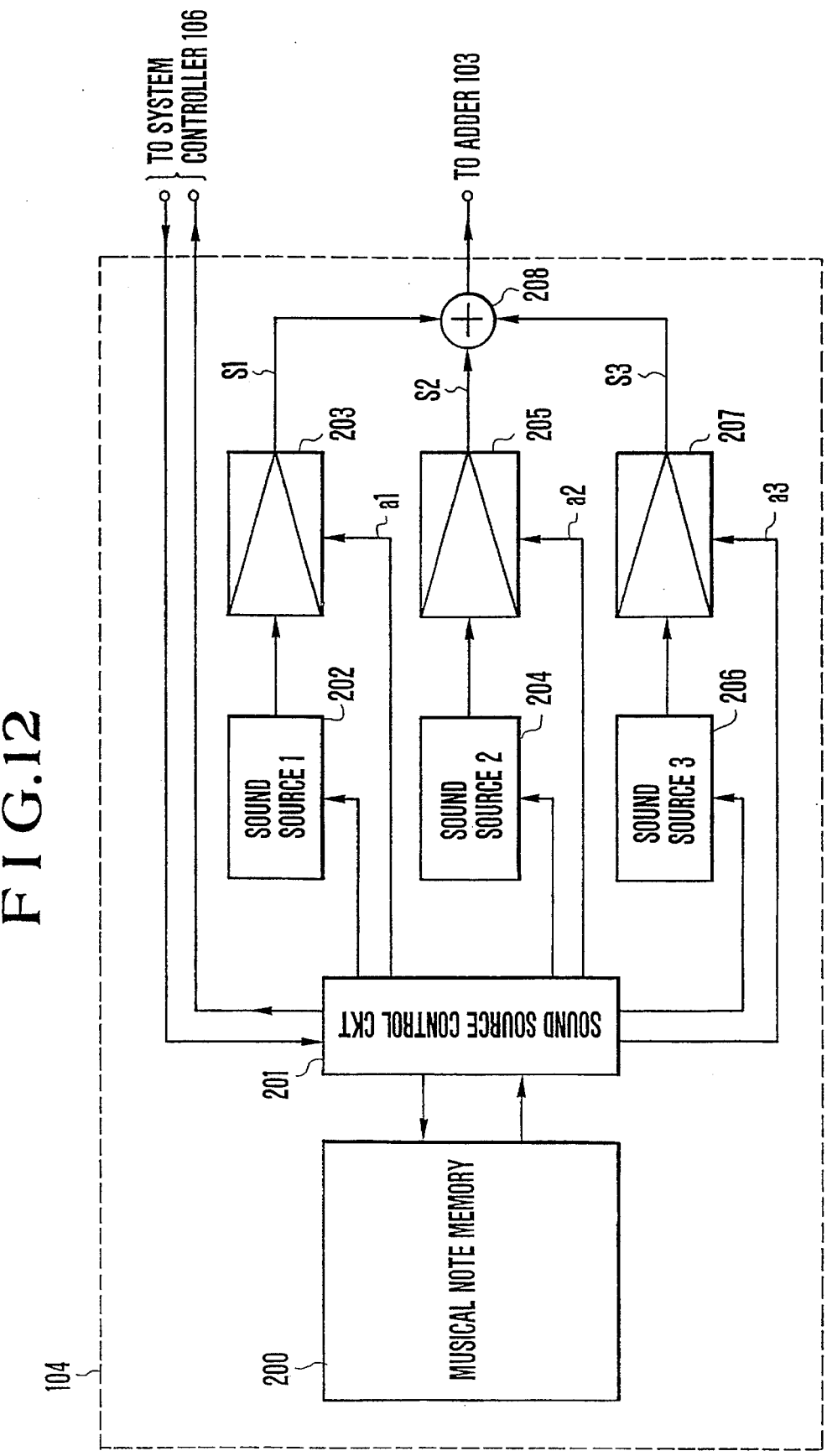
FIG. 12 is a block diagram of a practical example of construction of the main parts of FIG. 11.
Figure 14:
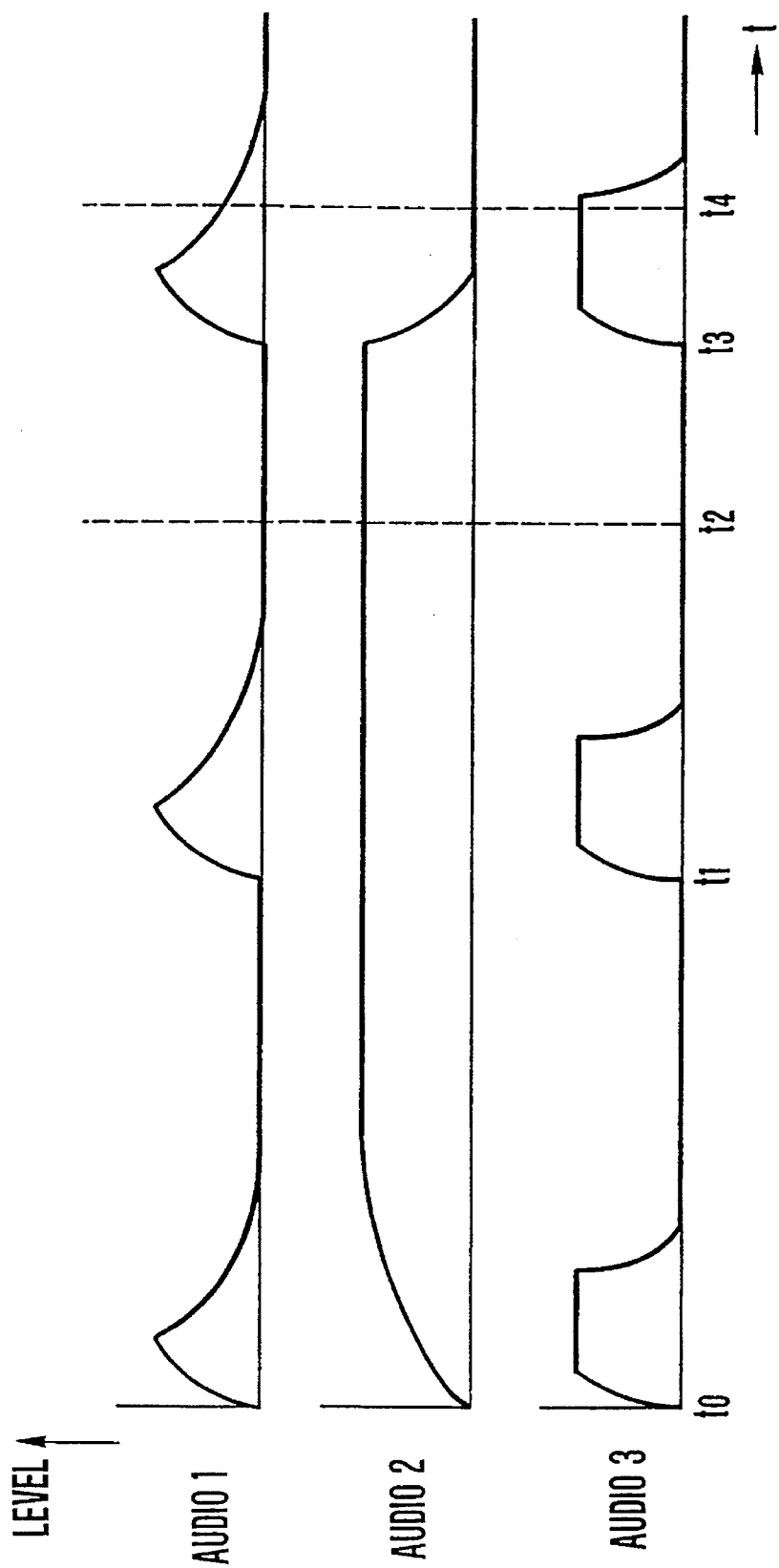
FIG. 14 shows the wave forms of the audio signals in the BGM generator shown in FIG. 12.

FIG. 12 in diagram shows a practical example of construction of the BGM generator 104 in FIG. 11. FIG. 14 schematically shows the audio signals output from the BGM generator 104.

When an output of BGM is instructed by the operation portion 107, the system controller 106 sends a command to a sound source control circuit 201. The sound source control circuit 201 then reads a musical note memory 200 to obtain control data required to control sound sources 1–3 (202, 204, 206) and sound level adjusters 203, 205 and 207. Of these control data, for the sound sources 1–3 (202, 204, 206), data which indicate, for example, musical scales (fundamental frequencies of oscillation) and tone colors (frequency spectrum) are given, and for the sound level adjuster 203, data which indicate the ramp timing, a period of duration, and the damp timing of a sound, and further the sound volume (mu-factor) for each sound are given.

According to each control data read from the musical note memory 200, each of the above-mentioned parameters is controlled so that audio signals S1, S2 and S3 formed as a musical sound are output from the sound level adjusters 203, 205 and 207. These audio signals S1, S2 and S3 are combined by an adder 208. Its output is supplied to another adder 103. In the adder 103, the audio signal from the microphone 102 built in the VTR 100 and the audio signal output from the adder 208 in the BGM generator 104 are added and recorded by the recording portion 105 together with the video signal from the video camera portion 101.

FIG. 15 is a flowchart for explaining the joined shooting operation of the system of the present embodiment. In the following, the manner of the joined shooting operation is described by reference to the timing chart of FIG. 14 and the flowchart of FIG. 15.

Prior to the recording, by manipulating the operation portion 107, a desired one of the sound programs stored in the musical note memory 200 in the BGM generator 104 is designated, that is, a music choosing operation is carried out (step S101). Based on this choice of the piece of music, determination is made of an address of the musical note memory 200 from which the reading should begin. This address is then set (step S102). Under this condition, if a recording command is given from the operation portion 107 (step S103), the recording portion 105 is rendered operative in the recording mode (step S104) and waits for its servo system to be pulled in (to come into a servo-lock state). When the servo is locked (step S105), the recording portion 105 actually starts recording the video signal and the audio signal and, at the same time, the BGM generator 104 starts outputting the audio signal of the chosen BGM (step S106).

Thus recording is carried out. With this, when the operation portion 107 commands pause of the recording (step S107), the recording portion 105 is switched to the pause mode (step S108). And, discrimination of whether or not the transition to the recording pause mode is completed is made by sensing the stoppage of the tape or other parts (step S109). If so, the read address of the musical note memory 200 in the BGM generator 104 is prohibited from changing (step S110). This read address is then returned by a predetermined amount (step S111). A time T corresponding to this predetermined amount of sound is set in the timer 108 (step S112).

A detailed explanation is made by using FIG. 14 about the setting of the aforesaid predetermined amount and time T. FIG. 14 shows an example of the aforesaid control data where the sound sources 1, 2 and 3 (202, 204, 206) start generating the respective sounds at a time $t_0$. At times $t_1$ and $t_2$ the sound sources 1 and 3 (202, 206) starts generating the respective sounds.

Now assuming that a joined shooting operation occurs at a time $t_4$ as the recording is stopped for a while and started again. The audio signals of alive sounds at this point of time are the ones denoted by "audio 1" and "audio 3". In this case, time must be back to earlier than the point $t_3$ at which the musical notes being generated by the sound sources 1 and 3 at the time $t_4$ start. Otherwise, the audio signal at earlier than the time $t_4$ which has already been recorded could not get continuous to an audio signal at later than the time $t_4$ which is to be recorded. The reason for this is that the control data for the signals "audio 1" and "audio 3" are read from the musical note memory 200 before the time $t_3$ and, from this time onward, govern the production of sounds, and that these sounds continue alive even after the time $t_4$.

Therefore, the above-mentioned predetermined amount of address and the time T are set so as to satisfy $T>(t_4-t_3)$.

Alternatively assuming that for the joined shooting purpose, the recording is stopped at the time t2 and re-started, then a likewise result is effected. That is, time must be back to earlier than the time $t_0$ at which the audio signal "audio 2" that will alive at the time $t_2$ starts. In this case, the above-mentioned predetermined period T is set so as to satisfy $T>(t_2-t_0)$.

In a case where this predetermined amount T is desired to be constant, it may be set longer than the maximum time $\tau$ of musical note. Also, even in this case, the returning amount of read address is determined according to this predetermined period T.

Now, returning to the flowchart of FIG. 15, in a step S111, the read address of the musical note memory 200 is returned by the above-described predetermined amount. The timer 108 is then set to the above-described predetermined period of time T in a step S112 and waits for release from the pause state. Here, if the operation portion 107 commands a release of pause (step S113), the sound source control circuit 201 starts reading the musical note memory 200 from the returned read address by the predetermined amount, causing the BGM generator 104 to start producing the music (step S114) and, at the same time, the timer 108 to start counting down the aforesaid predetermined time T (step S115). When the counted value of this timer has reached "0" (step S116), recording by the recording portion 105 is started (step S117). In this timing, it results that the BGM generator 104 produces an audio signal in continuation to the already recorded audio signal. Hence, it is assured that, on the tape, the audio signal gets continuity at the joined portions of the video signals.

Figure 13:
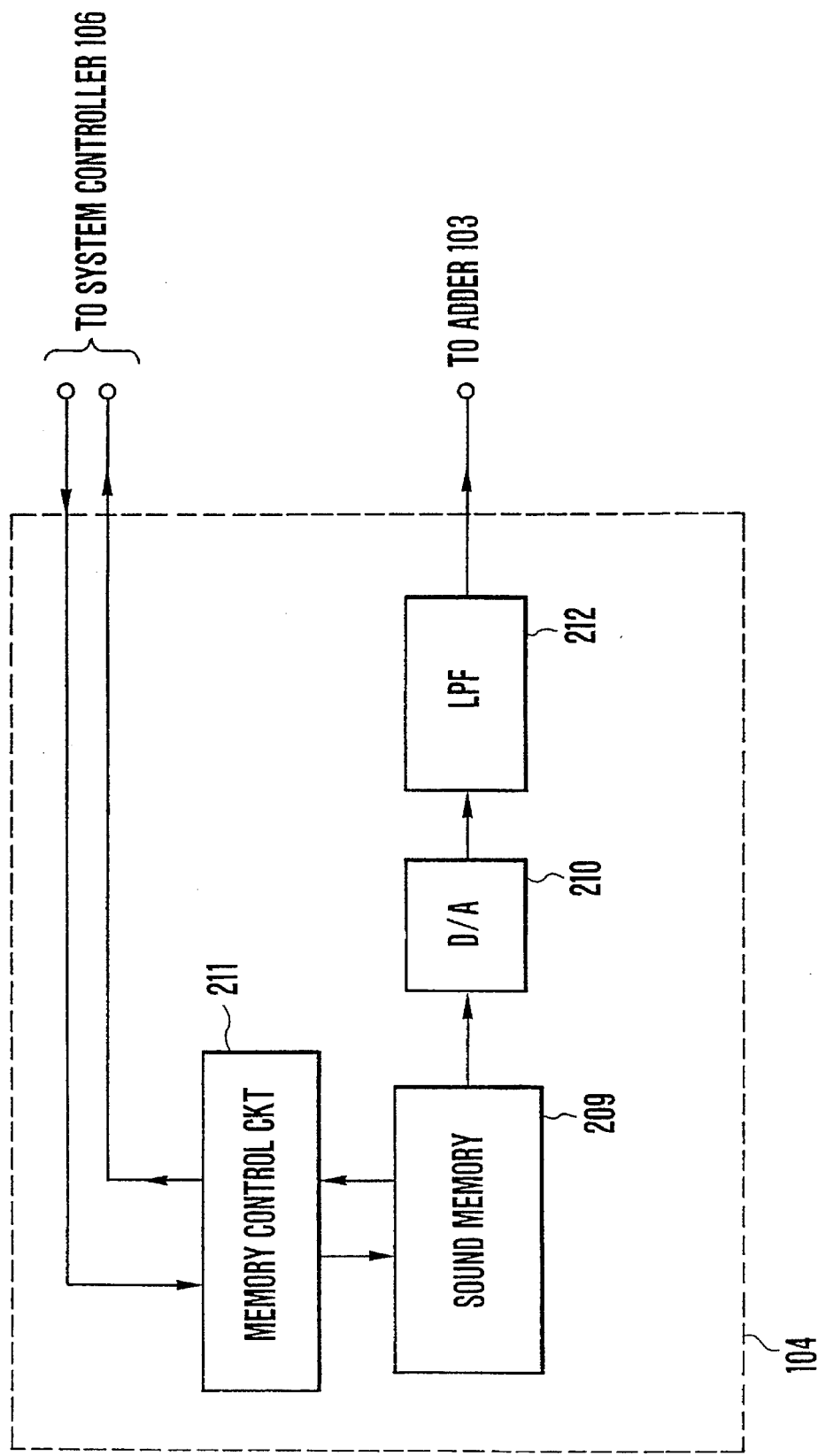
FIG. 13 is a block diagram of another practical example of construction of the main parts of FIG. 11.

FIG. 13 shows another practical example of construction of the BGM generator of FIG. 11, comprising a memory 209 in which audio signals are stored in themselves as digital information, a D/A converter 210 for converting the digital audio signal read from the memory 209 into an analog signal, and a low-pass filter (LPF) 212 for limiting a band of the analog audio signal output from the D/A converter 210.

Even in this case, similar to the first example described above, at the time of the pause of recording, responsive to a control signal from the system controller 106, a memory control circuit 211 stops reading the memory 209, and returns the read address by a predetermined amount. And, when the command of re-starting of recording is given from the operation portion 107, reading of the memory 209 is started from the returned read address by the predetermined amount. At a time when the read address has advanced until the address at which the preceding recording was stopped, the start of recording then occurs.

Here, the above-described amount of return of the read address is set in correspondence to a longer time than the maximum amount of delay of information by the LPF 212. By this, it is assured to keep continuity of the audio signals from the BGM generator 104 at the joined portions of the video signals.

As is apparent from the foregoing description, the processing operation of returning the information to be read from the memory by the predetermined amount in such a way as has been described above is a very advantageous process on the maintenance of continuity of the recorded audio signals in a case where the read information from the memory, after having been subjected to the processing in which a delay factor exists, is recorded on the recording medium.

It should be noted that though in the practical example of FIG. 12, the timing of re-start of recording has been controlled by the counted time of the timer 108, it may otherwise be determined in response to return of the read address of the musical note memory 200 to the address just before the recording was stopped. Even in this case, a similar advantage can be obtained. Also, in the practical example of FIG. 13, it is possible to determine the timing of re-start of recording not by the read address but by utilizing the timer 108.

As has been described above, according to the embodiments of the invention, in the system that the information read from the memory, after having been subjected to the predetermined processing including the delay factor is recorded together with the video signal, it has become possible that even though recording of video signals is once stopped and later re-started, the audio signal is recorded without discontinuity.

What is claimed is:

1. An information signal recording apparatus comprising:
   (a) information signal generating means having a read only memory storing data for generating a plural kinds of information signals, for reading from the read only memory data to generate an information signal selected from said plural kinds of information signals and generating the information signal according to the data read out;
   (b) recording means for recording with other information signal the information signal generated from said information signal generating means while causing a recording position to move for recording a signal on said recording medium, interrupting the recording operation when the recording operation of the information is intermittently operated, and restarting the recording operation upon reversing a recording position on the recording medium by a certain quantity; and
   (c) data reading control means for successively assigning a read address for reading said data relative to said memory during a period when the reading operation of the information signal is being operated by said recording means, said data reading control means being arranged, when the recording operation of said information signal by said recording means is interrupted, to temporarily hold the read address which has been assigned immediately before the interruption and to interrupt the reading operation of the data relative to said read only memory, and, when the recording operation of the information signal by said information signal recording means is restarted, to successively assign the read address of the data relative to said read only memory from the read address preceded said temporarily held read address by a certain quantity of read address and to restart the reading operation of data relative to said read only memory.

2. An information signal recording apparatus comprising:
   (a) video signal generating means for generating a video signal;
   (b) audio signal generating means having a read only memory storing data for generating a plural kind of audio signals, for reading from the read only memory data to generate an audio signal selected from said plural kind of audio signals and generating the audio signal according to the data read out;
   (c) recording means for recording the video signal generated from the video signal generating means and the audio signal generated from the audio signal generating means while causing a recording position to move for recording a signal on said recording medium and, when the recording operation of the information signal is intermittently operated, interrupting the recording operation, and restarting the recording operation upon reversing the recording position on the recording medium by a certain quantity; and (d) data reading control means for successively assigning a read address for reading said data relative to said memory during a period when the reading operation is being operated by said recording means, said data reading control means being arranged, when the recording operation by said recording means is interrupted, to temporarily hold the read address which has been assigned immediately before the interruption and to interrupt the reading operation of the data relative to said read only memory, and, when the recording operation by said recording means is restarred, to successively assign the read address of the data relative to said read only memory from the read address preceded said temporarily held read address by a certain quantity of read address and to restart the reading operation of the data relative to said read only memory.

3. An apparatus according to claim 2, wherein said data read control recording means is arranged, when the recording operation of said recording means is intermittently operated and if the recording operation is interrupted by the recording means, to reverse the recording position by a certain amount due the interruption in creating a recording area on the recording medium and to assign a read address for reading said data relative to said memory from the read address preceded said temporarily held read address by the quantity of the read address on the memory storing the data corresponding to the quantity of the information of the audio signal which can be recorded on the recording area on said recording media.

\* \* \* \* \*

UNITED STATES PATENT AND TRADEMARK OFFICE
CERTIFICATE OF CORRECTION

PATENT NO. : 5,510,901
DATED : April 23, 1996
INVENTOR(S) : Koji Takahashi, et al.

It is certified that error appears in the above-indentified patent and that said Letters Patent is hereby corrected as shown below:

Col. 10, line 47, change "$t_2$" to -- $t_3$ --.

Col. 13, line 14, change "restarred" to -- restarted --.

Signed and Sealed this

Fifteenth Day of October, 1996

*Attest:*

BRUCE LEHMAN

*Attesting Officer*     *Commissioner of Patents and Trademarks*